Sept 17, 1957  E. J. HUME  2,806,743
FLUX FEEDING SYSTEMS FOR ELECTRIC WELDING

Filed Dec. 19, 1955  2 Sheets—Sheet 1

INVENTOR
E. J. HUME
BY Young, Emery & Thompson
ATTYS.

Sept. 17, 1957 E. J. HUME 2,806,743
FLUX FEEDING SYSTEMS FOR ELECTRIC WELDING
Filed Dec. 19, 1955 2 Sheets-Sheet 2
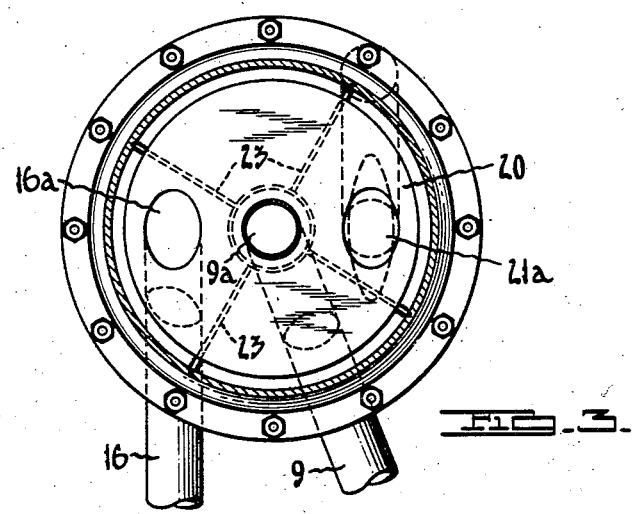
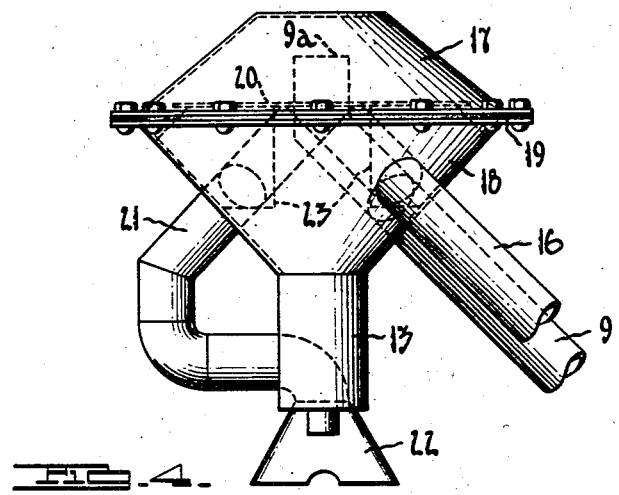
INVENTOR
E. J. HUME
BY Young, Emery & Thompson
ATTYS.

United States Patent Office 2,806,743
Patented Sept. 17, 1957

2,806,743

FLUX FEEDING SYSTEMS FOR ELECTRIC WELDING

Ernest Jeremy Hume, Carnegie, Victoria, Australia, assignor to Humes Limited, Melbourne, Australia, a company Application December 19, 1955, Serial No. 553,937

Claims priority, application Australia December 30, 1954

9 Claims. (Cl. 302—17)

This invention relates to flux feeding systems for electric welding and contemplates an improved method and apparatus for such purpose which will be most efficient, convenient and economical in operation.

One of the objects of the invention is to provide a method which utilises a relatively large capacity hopper, which may be located remote from the welding zone, and a feed hopper of relatively small capacity which is located slightly above the welding zone and interconnected by piping with the storage hopper and the work piece, and in which method provision is made for establishing and maintaining an air-flow or air-stream system which is entirely automatic in action and will ensure a substantially constant amount of flux powder being contained in the feed hopper, a copious and regular delivery of powder from that hopper to the work piece so as to achieve what is sometimes termed "submerged arc" welding and will simultaneously return surplus or unconsumed flux powder from the work piece to the feed hopper for re-use.

Many important practical advantages arise out of the foregoing as will become apparent from the following description and drawings relating to an embodiment of the invention that is at present preferred.

Referring to the drawings which form part of this specification:

Figure 3 is a sectional plan on line III—III of Figure 2.

Figure 4 is another elevation of the feed hopper.

Figure 1:
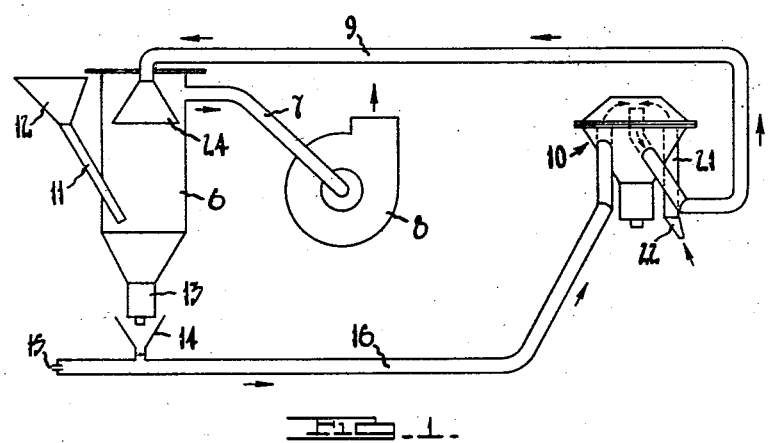
Figure 1 is a diagrammatic representation of the apparatus.
Figure 2:
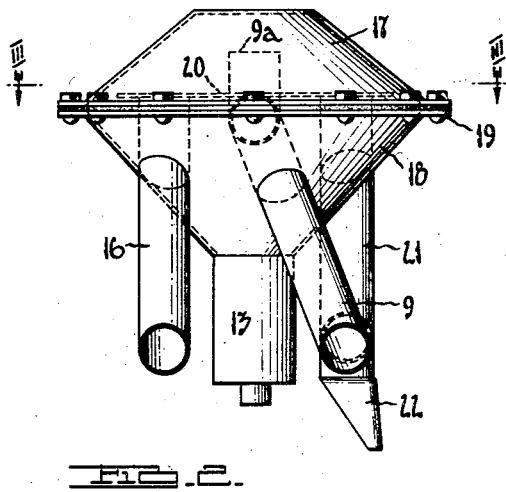
Figure 2 is an elevation of the feed hopper.

Referring firstly to Figure 1, the large capacity or bulk storage hopper 6 may, in general, be of any suitable form and size so as to contain an ample supply of the flux powder. An aperture formed near the top of the hopper is connected by piping 7 with a fan or pump 8 which with its driving means, e. g., an electric motor, are the only moving parts in the entire system. The fan may exhaust to atmosphere or through a trap for recovering such particles of powder as may be entrained in the air-stream.

The top of the bulk hopper 6 is connected by piping 9 to the upper part of the feed hopper 10 so that the upper parts of both hoppers will be subject to suction effect of the fan.

In order to maintain an adequate supply of flux powder in the bulk hopper it may be fitted with a charging device consisting of a relatively long tube 11 which at its lower end projects downwardly at a suitable inclination into the hopper and has a funnel-like enlargement 12 at its upper end which is located externally of the hopper and near the top thereof. This charging device should be kept substantially full of powder so that atmospheric air will be excluded from entering the hopper.

The powder is discharged from the bottom of the bulk hopper 6 at a desirable rate in order to be entrained in an air-stream by which it is conveyed into the feed hopper 10. To permit of such discharge, bearing in mind that a relatively low pressure obtains in the upper part of the hopper, we propose to utilise for that purpose a device 13 as disclosed in our copending application Serial No. 554,051 for patent entitled "Improvements in and Relating to the Feeding of Discrete or Finely Divided Materials From a Relatively Low Pressure Container" and which therefore need not be described in this present specification.

The flux powder from the bulk hopper may discharge into an open topped vessel 14 communicating at its lower end with a pipe leading to the feed hopper 10 and fitted at its open end with an air inlet nozzle 15 which may be axially adjustable. Air induced by the suction effect of the fan 8 will entrain the powder entering the pipe 16 and convey it to the feed hopper. The amount of powder thus conveyed per unit of time need only correspond with, or be slightly in excess of, the amount of flux that is consumed or fused at the welding zone in the same unit of time.

Reference will now be made to the feed hopper 10 which may advantageously have an upper section 17 in the form of a rather flat or shallow truncated cone and a lower section 18 in the form of a somewhat deeper and inverted truncated cone, the two sections being externally flanged at their meeting edges and suitably secured together with the interposition of a suitable gasket 19.

A horizontal baffle plate 20 may extend within the feed hopper 10 in approximate alignment with the meeting edges of the upper and lower sections so as to leave an annular gap around the baffle plate. The pipe 9 extending between the upper part of the feed hopper 10 and the top of the bulk hopper 6 may have its open inlet end 9a projecting centrally above baffle plate 20 for a short distance and from the underside of the plate it passes at an angle through the lower section of the feed hopper 10.

The pipe 16 conveying the powder-laden air-stream to the feed hopper may enter the lower section of the latter at an appropriate angle and terminate in a hole 16a disposed in the baffle plate 20 near its peripheral adge.

A third pipe 21 enters the feed hopper 10 in a manner similar to that of the last-mentioned pipe (and terminates in a hole 21a in the baffle 20) but at a position and at an inclination that is substantially opposite. This third pipe, which may have a swivel or flexible portion intermediate its length outside the feed hopper, is provided at its other or free end with a fishtail or other suitable nozzle 22 for the purpose of applying suction to the welding zone at that part of the joint or seam which has recently been welded in order that surplus flux powder will be induced along that pipe and returned to the feed hopper.

The bottom of the feed hopper 10 is preferably provided with a powder discharge or feed device 13 similar to that described in our aforesaid copending application Serial No. 554,051.

The discharged powder may be directed onto the work by a tapered hollow member (not shown) which may be fixed to a tube through which the electrode is fed to the work.

The feed hopper 10 may be provided internally of its lower section with a series (say four) of circumferentially spaced, vertically extending vanes 23.

The internal surfaces of the upper section 17 of the feed hopper and the upper surface of the horizontal baffle may be lined or sheathed with some appropriate material as protection against the abrading action of the incoming powder-laden air-stream.

In operation, it will be appreciated that a number of things are happening simultaneously and automatically due to the suction effect created by the fan which propagates throughout the piping system and the two hoppers. Thus, a moderate quantity of powder is conveyed in the air-stream travelling to the feed hopper from air inlet nozzle 15 by way of pipe 16. At the same time, a considerably greater quantity of flux powder will be entering the feed hopper by way of the surplus pick-up device 22 and the third pipe 21. There will also be a regular feed of the flux powder (corresponding approximately in amount or rate to that entering the feed hopper by the two sources just mentioned) from the outlet of the feed hopper to the work-piece. Thus it may be said that the amount of flux being delivered from the storage hopper to the feed hopper by way of pipe 16 will, at any time during welding operations, be about the same as is being actually consumed at the welding zone. The major proportion by far of the powder passing from the feed hopper to the work-piece consists of surplus or unconsumed powder which is picked up by the suction nozzle 22 and conveyed into the feed hopper.

There will also be a continuous flow of air from the upper part of the feed hopper into the top of the bulk hopper by way of pipe 9, and this air-stream may possibly carry with it a slight amount of powder from the feed hopper. Any such powder may be separated from the air-stream in the bulk hopper by virtue of the pipe 9 terminating in a hollow cone 24 disposed in the upper part of the bulk hopper, the suction pipe 7 being connected to the hopper 6 at a substantial distance above the bottom of cone 24.

By arranging for pipes 16 and 21 to enter the feed hopper 10 at opposed inclinations, as aforesaid, a desirable whirling action occurs in that part of the feed hopper immediately above baffle 20, with the result that the powder entrained in the air streams is precipitated and gravitates around the periphery of the baffle into the lower part of the hopper. The vertical vanes 23 prevent or break down any whirling effect in the lower part of the hopper 10 and therefore facilitate separation and gravitation of the powder.

The more salient advantages of the invention may be summarised as follows:

(1) The entire system is automatic in operation and requires only a minimum of attention.

(2) The feed hopper will remain charged to a substantially constant level with the flux powder so that there will be little, if any, variation in weight of the loaded feed hopper enabling it to be supported, as by a cantilever arm or beam as, for example, in our copending application Serial No. 553,939, now Patent No. 2,786,933, March 26, 1957, without any significant or excessive movement as would occur if the weight varied suddenly or to any material extent from time to time.

(3) There is a continuous and rapid circulation of flux powder between the feed hopper and the work-piece with the result that the powder fed to the work-piece will be preheated and undesirable moisture will have been dried out.

(4) The feed hopper need only be of relatively small capacity as the circulation system will ensure that an adequate amount of powder will always be contained in the feed hopper.

(5) The bulk or storage hopper can be located remote from the scene of the welding operations and its replenishment from time to time can be readily and conveniently attended to.

Having now described my invention, what I claim as new and desire to secure by Letters Patent is:

1. A system for feeding flux powder to the welding zone in electric arc welding operations comprising a relatively large capacity storage hopper located remote from the welding zone, a relatively small or feed hopper located slightly above the welding zone, piping connecting the top of the feed hopper with the welding zone, piping interconnecting the feed hopper with the storage hopper, piping connecting the upper portions of the hoppers, and suction means connected to the top portion of the storage hopper for establishing a continuous air stream through the upper portions of the hoppers and through the pipings so as to insure a substantially constant amount of flux powder in the feed hopper, to insure a copious delivery of powder from the feed hopper to the welding zone of the workpiece, and to insure an automatic return of surplus flux powder from the workpiece to the feed hopper.

2. A system according to claim 1, characterised in that the delivery of powder from the feed hopper to the workpiece corresponds approximately in amount or rate to that entering the feed hopper from the storage hopper plus that being returned from the workpiece to the feed hopper, the powder being returned to the feed hopper from the work-piece at a substantially greater rate than that of the powder entering the feed hopper from the storage hopper.

3. A system according to claim 1, characterised in that the amount of flux powder being delivered from the storage hopper to the feed hopper will at any time during welding operations be about the same as is being actually consumed at the welding zone, the major proportion of the powder passing from the feed hopper to the work-piece consisting of surplus or unconsumed powder which has been returned by suction from the work-piece to the feed hopper.

4. Apparatus for feeding flux powder to the welding zone in electric arc welding operations, comprising a relatively large capacity or bulk storage hopper, a relatively small or feed hopper supported slightly above the welding zone and adapted to deliver flux powder onto the workpiece, said storage hopper having a powder discharge device at its bottom, a first pipe having an air inlet and connected with said discharge device and leading therefrom into the upper part of said feed hopper, a second pipe leading from the upper part of said feed hopper into the top of said storage hopper, a third pipe having at one end an inlet nozzle for surplus or unconsumed powder that has been delivered to the work-piece from the feed hopper, said third pipe being connected at its other end to the feed hopper, and suction means located near the storage hopper and connected to the upper part of said storage hopper for creating a suction effect which propagates by way of said pipes to the upper parts of the storage hopper and the feed hopper and to the work-piece at a point or zone where the surplus powder accumulates.

5. Apparatus according to claim 4 wherein said second pipe is connected with a hollow conical member within the upper part of the storage hopper, and a pipe leading from said suction means opens into the storage hopper substantially above the bottom of said hollow cone.

6. Apparatus according to claim 4, wherein said first pipe has a powder inlet in the form of an open topped vessel for receiving powder from the discharge device of the storage hopper and an air inlet device whereby a powder-laden air stream is induced along said pipe into the feed hopper.

7. Apparatus according to claim 4, wherein said feed hopper includes a casing provided intermediately of its height with a horizontal baffle leaving a gap between its perimeter and the internal surface of the casing, said first and third pipes entering the casing at upward inclinations and terminating in holes formed in said baffle near its perimeter and opposite each other, said second pipe extending upwardly within said casing and having its upper open end disposed above said baffle.

8. Apparatus according to claim 7, wherein said casing comprises an upper part in the form of a truncated cone and a lower part in the form of an inverted truncated cone, said baffle being in approximate alignment with the meeting edges of said two parts.

9. Apparatus according to claim 7, including several vanes extending vertically downwards from said horizontal baffle.

References Cited in the file of this patent

UNITED STATES PATENTS

| 2,580,581 | Niemitz | Jan. 1, 1952 |
| 2,688,517 | Riordan | Sept. 7, 1954 |
| 2,688,518 | Krenke | Sept. 7, 1954 |